Patented Feb. 24, 1931

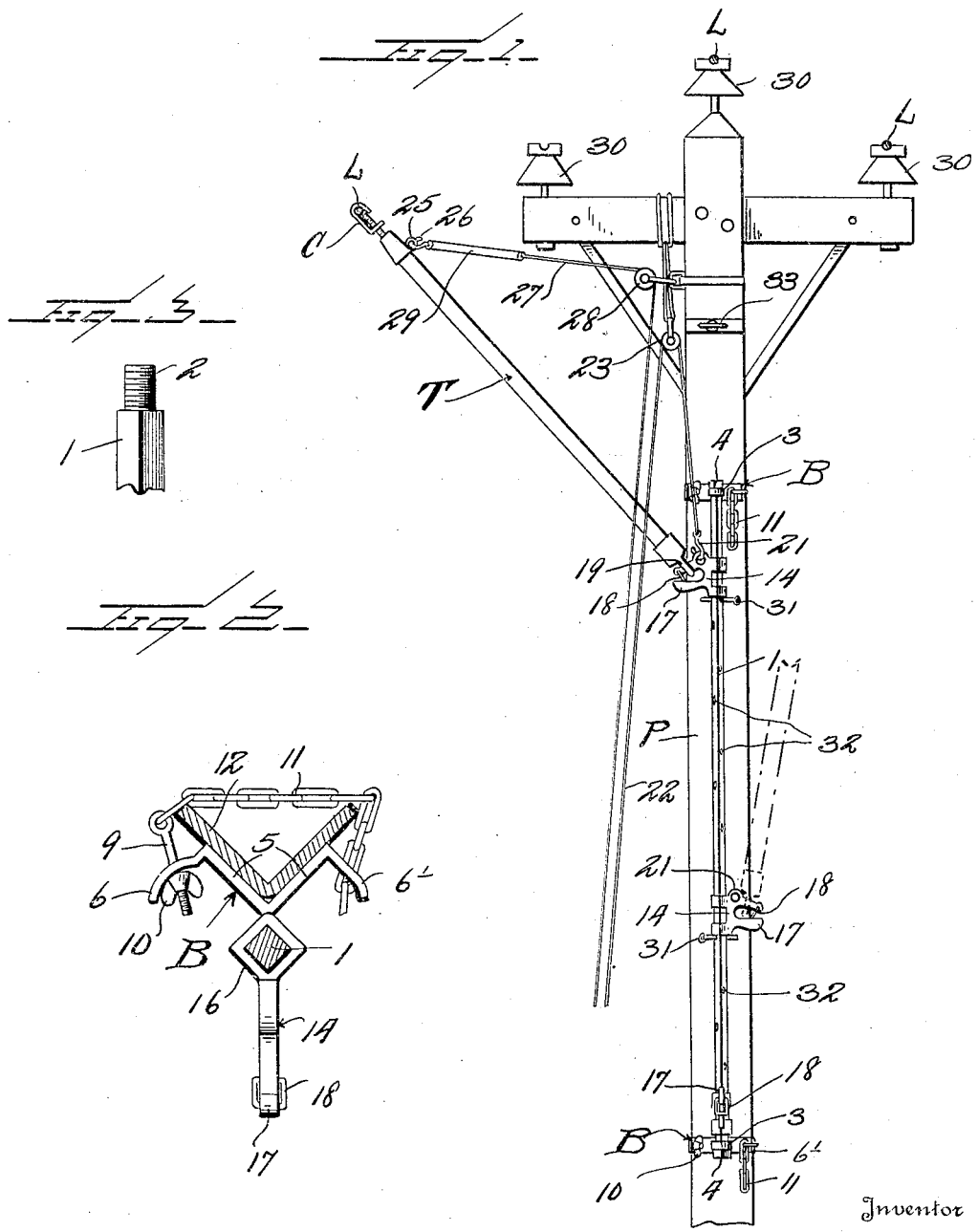

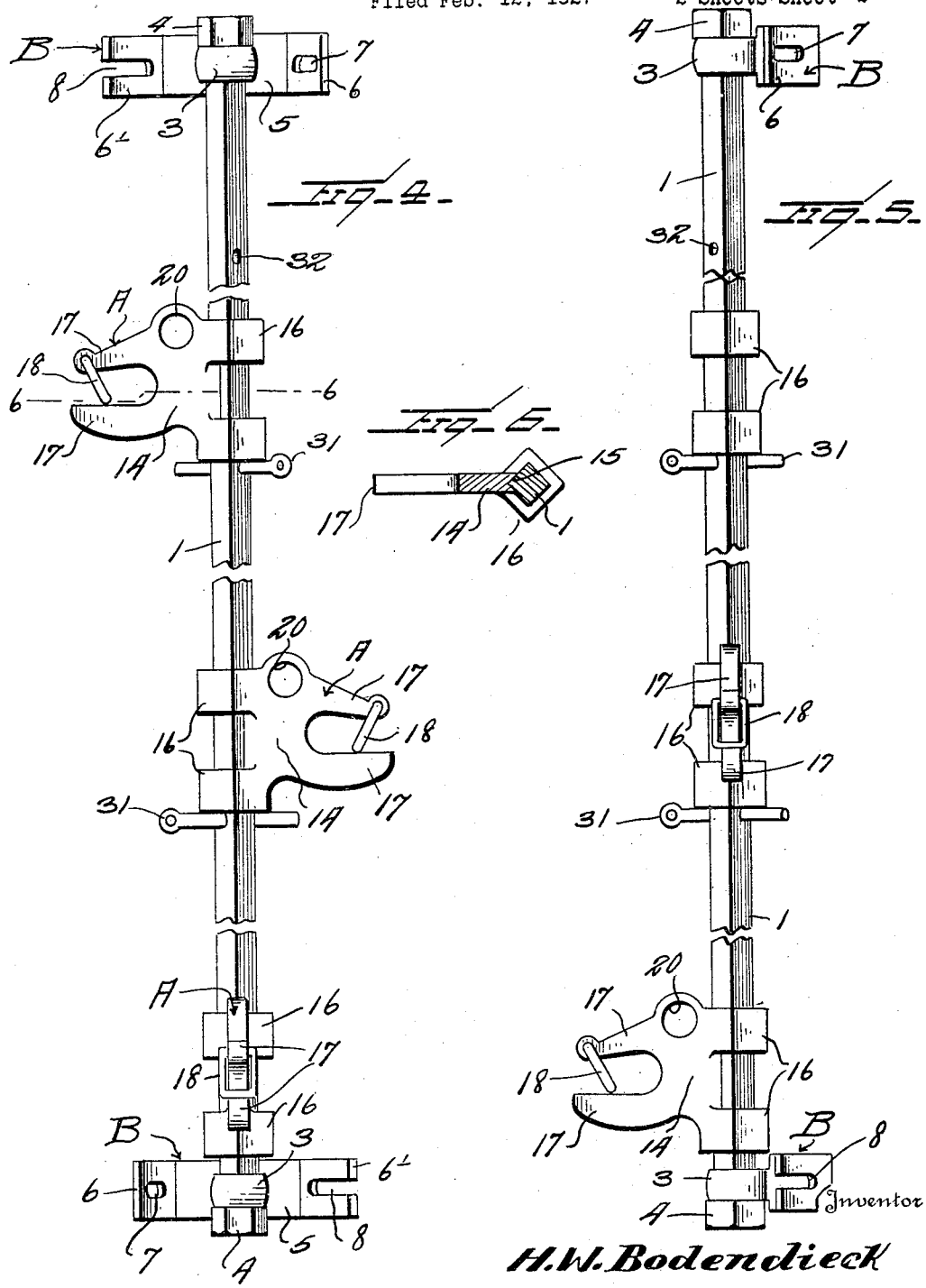

1,793,732

UNITED STATES PATENT OFFICE

HENRY W. BODENDIECK, OF TAYLORVILLE, ILLINOIS, ASSIGNOR, BY DIRECT AND MESNE ASSIGNMENTS, TO TIP'S TOOL COMPANY, INCORPORATED, OF TAYLORVILLE, ILLINOIS, A CORPORATION OF ILLINOIS

HANDLING APPARATUS FOR AERIAL LINES

Application filed February 12, 1927. Serial No. 167,859.

This invention relates to handling apparatus for aerial lines and it is an object of the invention to provide an apparatus of this kind which operates to provide temporary support for an aerial line.

It is also an object of the invention to provide an apparatus of this kind adapted for use in hot line maintenance and which is used to provide temporary support for such line when it is desired to effect a repair or replacement in connection with a permanent support for such line and which also holds the line in a position out of the way of the workman.

An additional object of the invention is to provide an apparatus of this kind of a portable type and which includes a support for a line tong together with means comprised in such support for operating a tong to move or shift a line, such as a high tensioned conductor or the like, as may be required during maintenance service.

The invention also has for an object to provide an apparatus of this kind adapted for use in connection with electrical transmission lines and which is adapted to provide temporary support for such lines as may be required by maintenance service without causing any interruption to the line service and in a manner whereby danger to the workman is reduced to a minimum.

The invention consists in the details of construction and in the combination and arrangement of the several parts of my improved handling apparatus for aerial lines whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is an elevational view illustrating an apparatus constructed in accordance with an embodiment of my invention, one of the tongs being indicated by full lines and a second tong being indicated by broken lines;

Figure 2 is a detailed sectional view illustrating the manner of attaching the support to an angle member;

Figure 3 is a fragmentary view in elevation of an end portion of the elongated member or bar as herein embodied;

Figure 4 is an enlarged view in front elevation of my improved support as herein disclosed;

Figure 5 is a view in side elevation of the structure as illustrated in Figure 4;

Figure 6 is a sectional view taken substantially on the line 6—6 of Figure 4.

As herein disclosed, my improved apparatus comprises an elongated supporting member or bar 1 herein disclosed as angular in cross section and which is provided at each extremity with a cylindrical extension 2 directed through an eye member 3 carried by a bracket B. Engaged with the extension 2 outwardly of the applied eye member 3 is a holding nut 4 or its equivalent.

Each of the brackets B comprises perpendicularly related arms or plates 5 terminating in outwardly disposed extension arms 6 and 6'. The extension arm 6 has its outer portion arcuate in form, said arcuate portion being provided with a longitudinally disposed closed slot 7 while the second extension arm 6' is provided with a longitudinally disposed slot 8 open at the outer end of the extension arm 6'. While not always essential, in practice I find it desirable to have the extension arms 6 and 6' of one bracket B reversely related with such extension arms of the second bracket B.

Disposed through the slot 7 is the shank of an eye bolt 9, said shank having engaged therewith a wing nut 10 contacting from without with the arcuate portion of the extension arm 6. Secured to the eye bolt 9 in a conventional manner is an end portion of a flexible member 11, herein disclosed as a chain, the opposite end portion of the chain being adapted to be adjustably connected, as occasions may demand, with the extension arm 6' by inserting a link of the chain 11 within the slot 8.

When the brackets B are applied to a conventional wooden pole P the outer or free end portions of the arms 5 of the brackets B will bite into the pole, thus further assuring the brackets being effectively maintained in applied position upon requisite tightening of the members 11. The relative arrangement of the arms 5, however, also permits the brackets to be operatively engaged with an angle member or beam 12 such as is comprised in the tower structure supports for high tensioned transmission lines.

As herein disclosed, the member or bar 1 has slidably engaged therewith a plurality of yokes A. In the present embodiment of my invention the yokes are three in number with two adjacent yokes disposed in opposite directions and the third yoke extending outwardly from the member or bar in perpendicular relation to the first mentioned yokes. This arrangement is provided to readily permit the desired handling of a number of lines.

As herein set forth, each of the yokes A comprises a plate 14 of requisite dimensions having its side faces disposed in the same general direction as the member or bar 1. The inner edge of the plate 14 is provided therealong with a groove or channel 15 of such cross sectional configuration to snugly receive a corner portion of the member or bar 1. The opposite end portions of this grooved or channeled edge of the plate 14 are provided with the outstanding cuffs or sleeves 16 which have snugly disposed therethrough the member or bar 1. By this means each of the yokes A is effectively held to the member or bar 1 yet is free for movement or adjustment lengthwise of said bar or member 1.

The outer portion of the plate 14 of each of the yokes A is provided with the jaws 17 spaced apart similar to the cuffs or sleeves 16 or in a direction lengthwise of the member or bar 1. One of said jaws 17 has pivotally connected with its outer extremity a retaining dog 18 herein disclosed as in the form of a link. This dog or link 18 is of a length in excess of the space between the outer end portions of the jaws 17 and thereby permitting ready entrance but normally closing such space and particularly against withdrawal. This dog or link 18 operates by gravity and it is, therefore, to be noted that it is operatively engaged with the upper of the two jaws 17.

Between the jaws 17 is adapted to be engaged an eye member 19 carried by an end portion of an elongated line tong or gin pole T. This tong or pole is of desired length and is provided at its outer or free end with a clamp C adapted to be engaged with the line to be manipulated.

The upper portion of the plate 14 of each of the yokes A, as herein disclosed, is provided with an opening 20 to permit convenient coupling therewith, as by a hook 21, of a cable 22. This cable 22 is disposed, when the apparatus is in assembly, over a guide member 23 suitably supported above the uppermost bracket B. As herein disclosed, this guide member 23 constitutes a pulley adapted to be suspended from the upper portion of the pole P or more particularly from a cross arm 24.

The outer portion of the tong or pole T is provided with an eye member 25 with which is engaged, as by a hook 26, a second cable 27. This cable 27 is operatively engaged with a guide member 28 preferably a pulley supported by the pole P at a point above the uppermost bracket B. These cables 22 and 27 are of such length as to be readily manipulated from the ground. The hook 26 and the cable 27 have preferably interposed therebetween an insulated link stick 29.

In practice, when it is desired to move or shift the lines L to replace an insulator 30, the brackets B are operatively engaged with the desired pole or kindred support and a tong or pole T is operatively engaged with a suitable yoke A and with the line L to be removed from such insulator. Pull is then imposed upon the cable 22 to move the yoke upwardly, such movement resulting in a lifting of the line L and a movement of such line outwardly from the pole P or kindred support, or more particularly the cross arm 24. After the yoke has been moved upwardly to substantially the limit of such movement a cotter pin 31 or the like is directed through a suitably positioned opening 32 in the member or bar 1 to maintain the yoke in such raised position.

When it is desired to again tie the line L to the replaced insulator, pull is imposed upon the cable 27 to swing the tong or pole T inwardly a distance sufficient to bring the line L substantially directly above the insulator. The cotter pin 31 is then removed and the yoke permitted to drop or move downwardly to bring the line L in proper position with respect to the insulator 30 to permit the same being conveniently tied thereto.

The cable 27 also provides an effective means for limiting the extent of side sway of the line L when released. This cable may be engaged with a suitable support at the ground provided the working operation is expected to take too long a time for the cable to be held by a workman and under certain conditions, particularly in connection with light work, the cable may be suitably engaged with the pole P for limiting the side sway of the line.

By having the yokes A arranged as hereinbefore stated, it will be obvious that the insulators at either side of the pole or kindred support or directly thereabove may be readily and conveniently replaced as may be desired.

When it is intended to remove the cross arm 24, a tong or pole T is engaged with each of the lines L supported by the pole P or the like, it being understood that in the assembly of my apparatus there will be a number of yokes A equal to the number of lines L.

The tong or pole coacting with the line substantially directly above the pole P or the like assumes substantially a vertical position and must, therefore, be held against any undue lateral swinging movement. In order to avoid any such undue lateral swinging movement, I find it of advantage to apply to the pole P or kindred support at a desired distance above the upper bracket B an eye member 33, or D-ring as known in the trade, and through which the tong or pole is freely inserted.

With the use of my improved apparatus it is to be noted that the stress of the line as supported by the tong is imposed through the tong directly upon the yoke, said tong constituting a column having an end abutting the yoke, thus assuring a maximum of holding resistance. This is further assured in view of the fact that the tong or pole P is free of longitudinal shifting or yield independently of the coacting yoke A.

This efficiency is accomplished due to the fact that the tong or pole P constitutes a rigid member and has swinging movement with respect to the yoke A about a fixed fulcrum.

From the foregoing description it is thought to be obvious that a handling apparatus for aerial lines constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus for handling an aerial line comprising a rigid tong, an end portion of which is engageable with the line, a supporting member, anchoring means for said supporting member, and means for pivotally connecting the opposite end portion of the tong to the member, said connection between the tong and member constituting a fixed fulcrum.

2. An apparatus for handling an aerial line comprising a rigid tong, an end portion of which is engageable with the line, a supporting member, anchoring means for said supporting member, means for pivotally connecting the opposite end portion of the tong to the member, said connection between the tong and member constituting a fixed fulcrum, and means for shifting the member.

3. An apparatus for handling an aerial line comprising a rigid tong, an end portion of which is engageable with the line, a supporting member, anchoring means for said supporting member, means for pivotally connecting the opposite end portion of the tong to the member, said connection between the tong and member constituting a fixed fulcrum, means for shifting the member, and means for moving the tong independently of the member.

4. An apparatus for handling an aerial line comprising a supporting member, anchoring means for said supporting member, a yoke slidably engaged therewith, a line tong having an extremity pivotally engaged with the yoke, and means for moving the yoke.

5. An apparatus for handling an aerial line comprising a supporting member, anchoring means for said supporting member, a yoke slidably engaged therewith, a line tong having an extremity pivotally engaged with the yoke, means for moving the yoke, and separate means for moving the tong relative to the yoke.

6. An apparatus for handling an aerial line comprising a supporting member, anchoring means for said supporting member, a yoke slidably engaged therewith, a line tong having an extremity pivotally engaged with the yoke, means for moving the yoke, and means for holding the yoke against movement in one direction.

7. An apparatus for handling an aerial line comprising a supporting member, a yoke slidably engaged, attaching means for said supporting member, a line tong pivotally engaged with the yoke, and means for moving the yoke.

8. An apparatus comprising an elongated member, attaching means carried thereby, a yoke engaged with the member for sliding movement therealong, a line tong operatively engaged with the yoke, and coacting means carried by the yoke and an extremity of the line tong for pivotally connecting the tong with the yoke.

9. An apparatus comprising an elongated member, attaching means carried by the member at points spaced lengthwise thereof, a yoke engaged with the member for sliding movement therealong and between the anchoring means, a line tong, and coacting means carried by the tong and yoke for detachably and pivotally connecting the tong to the yoke, said connection between the tong and member constituting a fixed fulcrum.

10. An apparatus for handling an aerial line comprising, in combination, an elongated member, brackets engaged with the opposite end portions of the member, each of said brackets comprising a pair of angularly related arms, a flexible holding member coacting with said arms, a yoke slidably engaged with the elongated member, and a line tong operatively engaged with the yoke.

11. In an apparatus of the class described, an elongated member, brackets engaged with the member at points spaced apart lengthwise thereof, a holding means coacting with each of the brackets, a yoke engaged with the member, and a second member having an end portion engageable with the yoke.

12. In an apparatus of the class described, an elongated member, brackets engaged with the member at points spaced apart lengthwise thereof, a holding means coacting with each of the brackets, a yoke engaged with the member, said yoke being slidable along the member, a second member having an end portion engageable with the yoke, and means for holding the yoke against movement in one direction.

13. An apparatus for handling aerial lines comprising a tong engageable at one extremity with a line, a support, the opposite end of said tong being pivotally engaged with said support, and means for imparting horizontal movement to the tong at the upper end of said tong, the pivoted end of the tong contributing to support the load imposed upon the tong and also allowing lateral movement of the tong.

14. An appliance for handling aerial lines comprising a tong engageable at one extremity with a line, a support, the opposite extremity of said tong being pivotally engaged with the support, and means for imparting horizontal movement to the tong at the outer end of said tong, the pivoted end of the tong contributing to support the load imposed upon the tong.

In testimony whereof I hereunto affix my signature.

HENRY W. BODENDIECK.